(12) United States Patent
Lee

(10) Patent No.: US 11,952,309 B2
(45) Date of Patent: Apr. 9, 2024

(54) GLASS SUBSTRATE CHEMICAL STRENGTHENING FURNACE APPARATUS

(71) Applicant: Samsung Display Co., LTD., Yongin-si (KR)

(72) Inventor: Hoi Kwan Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 601 days.

(21) Appl. No.: 16/941,220

(22) Filed: Jul. 28, 2020

(65) Prior Publication Data
US 2021/0198141 A1    Jul. 1, 2021

(30) Foreign Application Priority Data

Dec. 26, 2019   (KR) .......................... 10-2019-0174655

(51) Int. Cl.
*C03C 21/00*    (2006.01)
*F27B 3/28*    (2006.01)

(52) U.S. Cl.
CPC .................................. *C03C 21/002* (2013.01)

(58) Field of Classification Search
CPC ... C03C 21/002; C03C 21/00; F27B 17/0025; F27D 5/00; F27D 5/005
See application file for complete search history.

(56) References Cited

U.S. PATENT DOCUMENTS

| | | | | |
|---|---|---|---|---|
| 1,693,249 A | * | 11/1928 | Pauly | A01J 9/04 165/169 |
| 3,628,934 A | * | 12/1971 | Duthoit | C03C 21/001 65/114 |
| 4,125,154 A | * | 11/1978 | Franke | C03C 21/001 165/169 |
| 4,129,289 A | | 12/1978 | Miyasita et al. | |
| 4,192,288 A | * | 3/1980 | Heller | C10C 3/12 126/343.5 A |
| 4,397,668 A | * | 8/1983 | Schelinski | C03C 21/001 65/170 |
| 4,441,698 A | * | 4/1984 | Limque | F27D 5/005 266/249 |
| 5,207,578 A | * | 5/1993 | Sakata | C30B 31/16 432/152 |
| 9,284,211 B2 | * | 3/2016 | Gu | C03B 23/0066 |

(Continued)

FOREIGN PATENT DOCUMENTS

| | | |
|---|---|---|
| CN | 203533574 U | 4/2014 |
| CN | 203569051 U | 4/2014 |

(Continued)

*Primary Examiner* — Jodi C Franklin
(74) *Attorney, Agent, or Firm* — CANTOR COLBURN LLP

(57) ABSTRACT

A glass substrate chemical strengthening furnace apparatus includes a bottom portion and a side wall extending from an edge of the bottom portion, where the bottom portion and the side wall define a reaction space; and a plurality of heaters providing heat to the reaction space. The bottom portion includes an inclined portion located at a center and a collection portion disposed between the inclined portion and the side wall, the collection portion is in a groove shape in which an upper surface thereof is further recessed than the inclined portion, and the plurality of heaters includes a bottom heater disposed in the bottom portion or adjacent to the bottom portion.

12 Claims, 16 Drawing Sheets

(56) References Cited

U.S. PATENT DOCUMENTS

| | | | | |
|---|---|---|---|---|
| 9,359,250 B2* | 6/2016 | Jin | | C03C 21/005 |
| 10,556,826 B2* | 2/2020 | Amin | | B01J 39/02 |
| 2002/0157739 A1* | 10/2002 | Fisher | | C21D 9/0037 |
| | | | | 148/567 |
| 2011/0041558 A1* | 2/2011 | Kim | | C03B 25/025 |
| | | | | 65/181 |
| 2011/0293942 A1* | 12/2011 | Cornejo | | C03C 3/083 |
| | | | | 65/355 |
| 2013/0128416 A1* | 5/2013 | Weber | | C03C 21/002 |
| | | | | 361/679.01 |
| 2013/0219965 A1* | 8/2013 | Allan | | C03C 21/002 |
| | | | | 65/30.14 |
| 2015/0218045 A1* | 8/2015 | Balcom | | C03B 25/02 |
| | | | | 65/117 |
| 2016/0326051 A1* | 11/2016 | Kim | | C03C 21/002 |
| 2016/0338152 A1* | 11/2016 | Lestringant | | C03C 17/32 |
| 2017/0001814 A1* | 1/2017 | Kim | | B65G 49/061 |
| 2017/0191759 A1* | 7/2017 | Pfahler | | H01L 21/67248 |
| 2017/0194163 A1* | 7/2017 | Cosceev | | H01L 21/2686 |
| 2018/0366352 A1* | 12/2018 | Müller | | F27D 5/0037 |
| 2020/0140329 A1* | 5/2020 | Suehara | | G01N 33/386 |
| 2020/0171478 A1* | 6/2020 | Bernard | | C03C 21/002 |
| 2020/0172434 A1* | 6/2020 | Dafin | | C03C 21/002 |
| 2020/0291500 A1* | 9/2020 | Ebner | | F27D 3/0024 |
| 2021/0371331 A1* | 12/2021 | Kim | | C03C 23/0085 |
| 2022/0002193 A1* | 1/2022 | Lee | | C03C 21/003 |
| 2022/0234934 A1* | 7/2022 | Park | | F27D 5/0043 |

FOREIGN PATENT DOCUMENTS

| | | | | |
|---|---|---|---|---|
| CN | 203794845 U | | 8/2014 | |
| CN | 204090614 U | | 1/2015 | |
| CN | 109681884 A | | 4/2019 | |
| JP | H05230525 A | * | 2/1992 | ........... C03C 21/002 |
| JP | H05339035 A | * | 6/1992 | ........... C03C 21/002 |
| JP | 173532 A | | 6/1999 | |
| KR | 101132869 B1 | | 4/2012 | |
| KR | 101143303 B1 | | 5/2012 | |
| KR | 101333289 B1 | | 11/2013 | |
| KR | 101406464 B1 | | 6/2014 | |
| KR | 101406508 B1 | | 6/2014 | |
| KR | 1020140110364 A | | 9/2014 | |
| KR | 1020160088541 A | | 7/2016 | |

* cited by examiner

GLASS SUBSTRATE CHEMICAL STRENGTHENING FURNACE APPARATUS

This application claims priority to Korean Patent Application No. 10-2019-0174655, filed on Dec. 26, 2019, and all the benefits accruing therefrom under 35 U.S.C. § 119, the content of which in its entirety is herein incorporated by reference.

BACKGROUND

1. Field

Embodiments of the invention relate to a glass substrate chemical strengthening furnace apparatus.

2. Description of the Related Art

Glass articles are widely used in electronic appliances including display devices, as building materials, or the like. For example, the glass articles are applied to substrates of flat panel display devices such as a liquid crystal display ("LCD"), an organic light-emitting diode ("OLED"), and an electrophoretic display ("EPD"), or cover windows for protecting the substrates.

As display devices of portable electronic device such as smart phones and tablet PCs are developed in bendable, foldable, and rollable forms, the glass articles applied thereto are also desired to have characteristics corresponding thereto.

In the cover windows of conventional foldable display devices, a colorless polyimide ("CPI") film has been used, but recently, ultra-thin glass has attracted attention due to better scratch vulnerability and a bidirectional folding possibility.

SUMMARY

Embodiments of the invention are to provide a glass substrate chemical strengthening furnace apparatus to minimize the scattering of fine glass particles therein.

An embodiment of a glass substrate chemical strengthening furnace apparatus includes a bottom portion e and a side wall extending from an edge of the bottom portion, where the bottom portion and the side wall define a reaction space; and a plurality of heaters which provides heat to the reaction space. In such an embodiment, the bottom portion includes an inclined portion located at a center thereof and a collection portion disposed between the inclined portion and the side wall, the collection portion is in a groove shape in which an upper surface thereof is further recessed than the inclined portion, and the plurality of heaters includes a bottom heater disposed in the bottom portion or adjacent to the bottom portion.

Another embodiment of a glass substrate chemical strengthening furnace apparatus includes a bottom portion and a side wall extending from an edge of the bottom portion, where the bottom portion and the side wall define a reaction space; a plurality of heaters which provides heat to the reaction space; and a plurality of ultrasonic generators which provides ultrasonic waves to the reaction space. In such an embodiment, the plurality of heaters is disposed in the side wall or adjacent to the side wall, and not disposed in the bottom portion or at upper and lower portions of the bottom portion, and the plurality of ultrasonic generators is disposed in the bottom portion or adjacent to the bottom portion.

Another embodiment of a glass substrate chemical strengthening furnace apparatus includes a bottom portion and a side wall extending from an edge of the bottom portion, where the bottom portion and the side wall define a reaction space; a plurality of heaters which provides heat to the reaction space; and a porous ceramic filter which adsorbs fine particles. In such an embodiment, the plurality of heaters includes a side wall heater disposed in the side wall or adjacent to the side wall.

According to embodiments of the glass substrate chemical strengthening furnace apparatus, the occurrence of scratches and stabbed defects caused by fine glass particles scattered is substantially minimized or effectively prevented in the glass substrate chemical strengthening furnace apparatus.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

Figure 1:
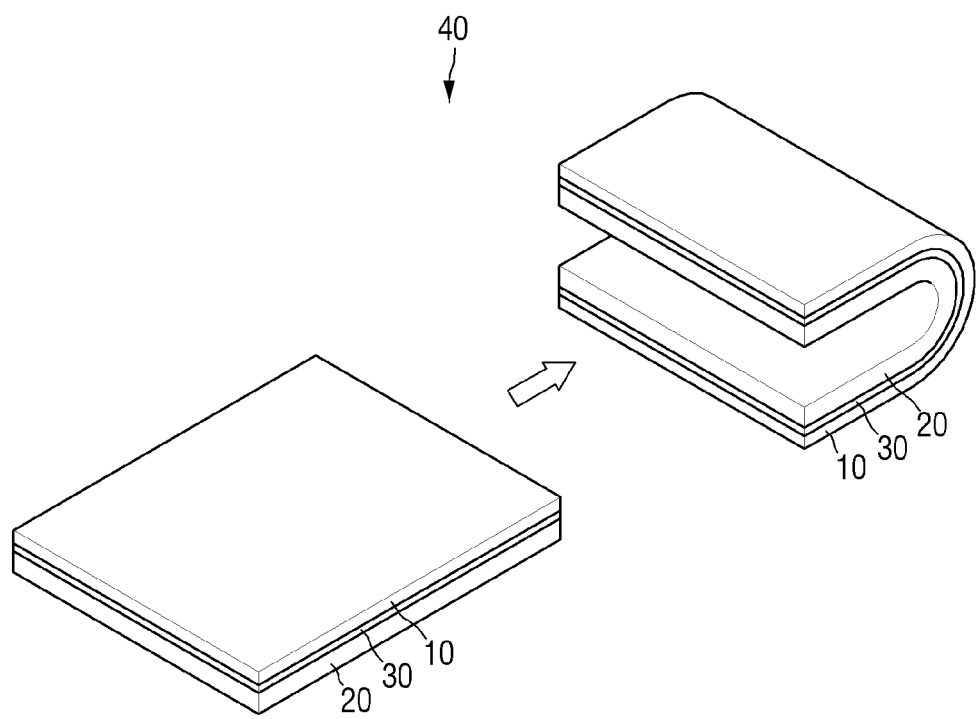
FIG. 1 is a perspective view illustrating an embodiment of a display device in which a glass article a is applied as a cover window thereof.

The invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

The same reference numbers indicate the same components throughout the specification.

As used herein, a "glass article" refers to an article entirely or partially made of glass.

Hereinafter, embodiments of the invention will be described in detail with reference to the accompanying drawings.

FIG. 1 is a perspective view illustrating an embodiment of a display device in which a glass article is applied as a cover window thereof.

Referring to FIG. 1, glass may be used for a cover window for protecting display devices in electronic devices including display devices, such as a refrigerator and a washing machine including a display screen as well as a tablet personal computer ("PC"), a laptop computer, a smartphone, an electronic book, a television, and a PC monitor, an optical member such as a substrate for a display panel, a substrate for a touch panel, and a light guide plate, and the like. The glass may also be used for cover glass for automotive substrates and the like, cover glass for solar cells, interior materials of building materials, windows of buildings and houses, etc.

A glass article 10 may be desired to have a high strength. In an embodiment where the glass article 10 is used as a cover window of a display device, the glass article 10 maybe desired not only to have a thin thickness for high transmittance and light weight, but also to have a high strength not to be easily broken by an external impact. A strengthened glass article 10 may be manufactured by a chemical strengthening method, including an ion exchange process.

FIG. 1 illustrates an embodiment in which the glass article 10 is applied as a cover window of a display device 40. In an embodiment, as illustrated in FIG. 1, the display device 40 may include a display panel 20, a glass article 10 disposed on the display panel 20, and an optical clear bonding layer 30 disposed between the display panel 20 and the glass article 10 to bond the display panel 20 and the glass article 10.

In such an embodiment, the display device 40 may be a foldable display device 40. The display panel 20 used in the foldable display device 40 may be a flexible panel of which at least a part may be folded.

The display panel 20 may include, for example, not only self-emission display panels, such as an organic light emitting display panel ("OLED"), an inorganic light emitting display ("inorganic ELD") panel, a quantum-dot light emitting display ("QED") panel, a micro light emitting diode ("LED") display panel, a nano LED display ("nano-LED") panel, a plasma display panel ("PDP"), a field emission display ("FED") panel, and a cathode-ray display ("CRT") panel, but also light receiving display panels, such as a liquid crystal display ("LCD") panel and an electrophoretic display ("EPD") panel.

The display panel 20 may include a plurality of pixels and display an image by using light emitted from each pixel. The display device 40 may further include a touch member (not illustrated). In an embodiment, the touch member may be integrally formed in the display panel 20 as an element thereof. In one embodiment, for example, the touch member may be directly formed on a display member of the display panel 20, such that the display panel 20 itself may perform a touch function. In an alternative embodiment, the touch member may be manufactured separately from the display panel 20, and then attached to an upper surface of the display panel 20 by the optical clear bonding layer.

The glass article 10 is disposed on the display panel 20. The glass article 10 protects the display panel 20 on the display panel 20. The glass article 10 used as the cover window of the foldable display device 40 may be an ultra-thin glass. The ultra-thin glass may have a thickness of about 300 micrometers (μm) or less, or about 100 μm or less.

The optical clear bonding layer 30 is disposed between the display panel 20 and the glass article 10. The optical clear bonding layer 30 serves to fix the glass article 10 on the display panel 20. The optical clear bonding layer 30 may include an optical clear adhesive ("OCA"), an optical clear resin ("OCR"), or the like. When the display device 40 is folded, the glass article 10 and the optical clear bonding layer 30 may be folded in a shape corresponding to the display panel 20.

Hereinafter, an embodiment of the strengthened glass article 10 described above will be described in greater detail.

Figure 2:
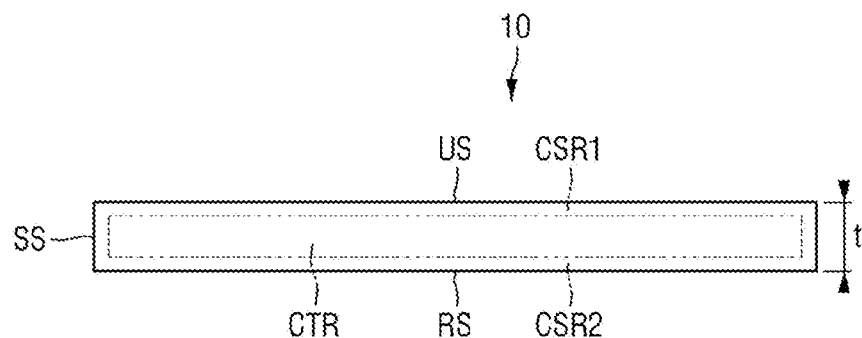
FIG. 2 is a cross-sectional view of the glass article according to an embodiment.

FIG. 2 is a cross-sectional view of the glass article according to an embodiment.

Referring to FIG. 2, an embodiment of the glass article 10 includes a plurality of surfaces US, RS, and SS. The surfaces of the glass article may include a first surface US, a second surface RS, and a side surface SS. In an embodiment, where the glass article 10 has a flat plate shape, the first surface US and the second surface RS are main surfaces having large areas (for example, an upper surface and a lower surface), and the side surface SS is an outer surface connecting the first surface US and the second surface RS.

The first surface US and the second surface RS face each other in a thickness t direction. In an embodiment, where the glass article 10 is used as a window of the display device which transmits light, the light may mainly enter one of the first surface US and the second surface RS and pass through the other surface thereof.

The thickness t of the glass article 10 is defined as a distance between the first surface US and the second surface RS. In an embodiment, the glass article 10 may be an ultra-thin glass. In such an embodiment, the thickness t of the glass article 10 may be in a range of 10 μm to 300 μm. In an embodiment, the thickness t of the glass article 10 may be equal to or less than about 100 μm. In such an embodiment, the thickness t of the glass article 10 may be equal to or less than about 70 μm. In such an embodiment, the thickness t of the glass article 10 may be equal to or less than about 50 μm. In such an embodiment, the thickness may be about 30 μm or less, but of course, the invention is not limited thereto. In an embodiment, the glass article 10 may have a uniform or constant thickness t, but is not limited thereto. Alternatively, the glass article 10 may have a different thickness for each region.

In an embodiment, as shown in FIG. 2, the strengthened glass article 10 includes compressive regions CSR1 and CSR2 and a tensile region CTR. The compressive regions CSR1 and CSR2 are regions where compressive stress is applied, and the tensile region CTR is a region where tensile stress is applied. The compressive regions CSR1 and CSR2 are disposed adjacent to the surfaces US, RS, and SS of the glass article 10 and the tensile region CTR is disposed in an inner region (or central region) of the glass article 10. The compressive region may be disposed adjacent to the side surface SS as well as the first surface US and the second surface RS. The depths (compressive depths) of the compressive regions CSR1 and CSR2 extending from each of the surfaces US, RS, and SS in an inward direction, e.g., a depth direction from the first and second surfaces UR and RS, may be substantially uniform, but is not limited thereto. The tensile region CTR may be surrounded by the compressive regions CSR1 and CSR2.

Figure 3:
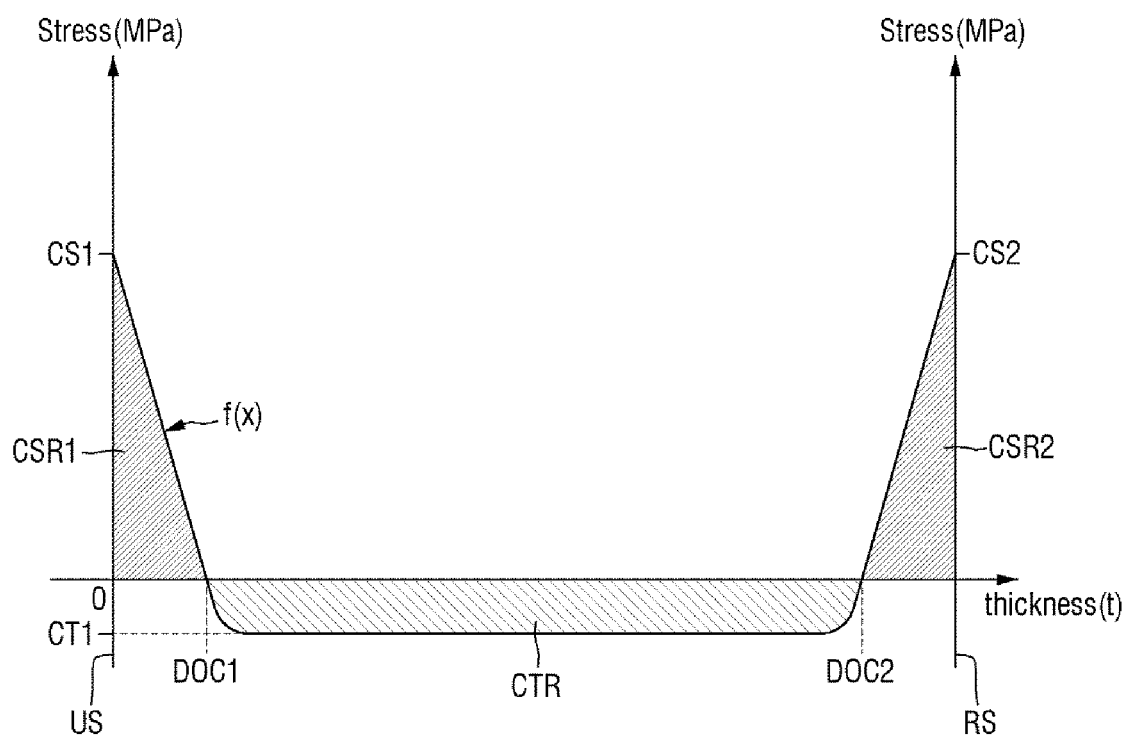
FIG. 3 is a graph showing a stress profile of the glass article according to an embodiment.

FIG. 3 is a graph showing a stress profile of the glass article according to an embodiment. In the graph of FIG. 3, an x axis represents a thickness t direction of the glass article 10. In FIG. 3, the compressive stress is indicated as a positive value and the tensile stress is indicated as a negative value. Herein, the magnitude of the compressive/tensile stress means a magnitude of an absolute value irrespective of a sign of the value.

Referring to FIGS. 2 and 3, the glass article 10 includes a first compressive region CSR1 extending from the first surface US to a point at a first depth (first compressive depth, DOC1) and a second compressive region CSR2 extending from the second surface RS to a point at a second depth (second compressive depth, DOC2). The tensile region CTR is between the first compressive depth DOC1 and the second compressive depth DOC2. Although not illustrated in FIG. 3, the compressive region and the tensile region may be disposed even between opposite sides SS of the glass article 10 in a similar manner.

The first compressive region CSR1 and the second compressive region CSR2 are resistant to an external impact to mitigate the occurrence of cracks in the glass article 10 or the breakage of the glass article 10. It may be understood that the greater the maximum compressive stresses CS1 and CS2 of the first and second compressive regions CSR1 and CSR2 are, the greater the strength of the glass article 10 becomes. Since the external impact is generally transmitted through the surfaces US, RS, and SS of the glass article 10, it is desired to have the maximum compressive stresses CS1 and CS2 on the surfaces US, RS, and SS of the glass article 10 in terms of durability.

The first compressive depth DOC1 and the second compressive depth DOC2 may effectively prevent cracks or scratches formed in the first and second surfaces US and RS from propagating into the tensile region CTR in the glass article 10. As the first and second compressive depths DOC1 and DOC2 are greater, the propagation of cracks and the like may be better prevented.

The graph of FIG. 3 is a stress profile of a region crossing the first surface US and the second surface RS in a thickness direction. Since the ion exchange may occur in the side surface SS similar to that of the first surface US and the second surface RS, a stress profile similar to that of the first compressive region CSR1 may be shown.

The stress energy accumulated in one region having a constant width in the thickness t direction in the glass article 10 may be calculated as an integrated value of the stress profile. The following Equation 1 may be satisfied when the stress profile in the glass article 10 having the thickness t is represented by a function f(x).

$$\int_0^t f(x)dx=0 \qquad \text{[Equation 1]}$$

That is, in the stress profile illustrated in FIG. 3, a sum of an area of the region corresponding to the first compressive region CSR1 and an area of the region corresponding to the second compressive region CSR2 may be equal to a sum of areas of the regions corresponding to the tensile region CTR.

Throughout the glass article 10, the tensile stress of the tensile region CTR may be balanced with the compressive stress of the compressive regions CSR1 and CSR2. That is, the total compressive stress (i.e., compressive energy) and the total tensile stress (i.e., tensile energy) in the glass article 10 may be the same as each other. Specifically, the sum of the total compressive stress (i.e., first compressive energy) of the first compression region CSR1 and the total compressive stress (i.e., second compressive energy) of the second compressive region CSR2 may be equal to the total tensile stress (i.e., tensile energy) of the tensile region CTR.

If the magnitude of the tensile stress in the glass article 10 is substantially great, fragments are violently released and the breakage may occur from the inside of the glass article 10 when the glass article 10 is broken. If the glass article 10 is an ultra-thin type having a thickness t of equal to or less than about 50 μm, the thickness of the tensile region CTR may not be effectively secured, and thus the magnitude of the tensile stress may be substantially large. Therefore, when the ultra-thin glass article 10 is broken, the fragments may be violently released. In an embodiment, when the ultra-thin glass article 10 is broken in a slow cooling process during or after strengthening, fine glass particles may be generated as the fragments.

In an embodiment, a maximum tensile stress CT1 of the ultra-thin glass article 10 may be about 100 megapascals (MPa) or greater, about 150 MPa or greater, or about 200 MPa of greater, but is not limited thereto.

The maximum tensile stress CT1 of the glass article 10 may generally be disposed in a central portion in the thickness t direction of the glass article 10. In one embodiment, for example, the maximum tensile stress CT1 of the glass article 10 may be located at a depth in a range of 0.4 t to 0.6 t or in a range of 0.45 t to 0.55 t, or at a depth of about 0.5 t, where t denotes the entire thickness of the glass article 10.

The first compressive depth DOC1 and the second compressive depth DOC2 prevent cracks or grooves formed in the first and second surfaces US and RS from propagating into the tensile region CTR in the glass article 10. As the first and second compression depths DOC1 and DOC2 are larger, the propagation of cracks and the like may be better prevented. Points corresponding to the first compressive depth DOC1 and the second compressive depth DOC2 correspond to boundaries between the compressive regions CSR1 and CSR2 and the tensile region CTR, and a stress value thereof is zero. The stress profile as illustrated in FIG. 3 may be formed through an ion exchange process in a chemical strengthening step.

Figure 4:
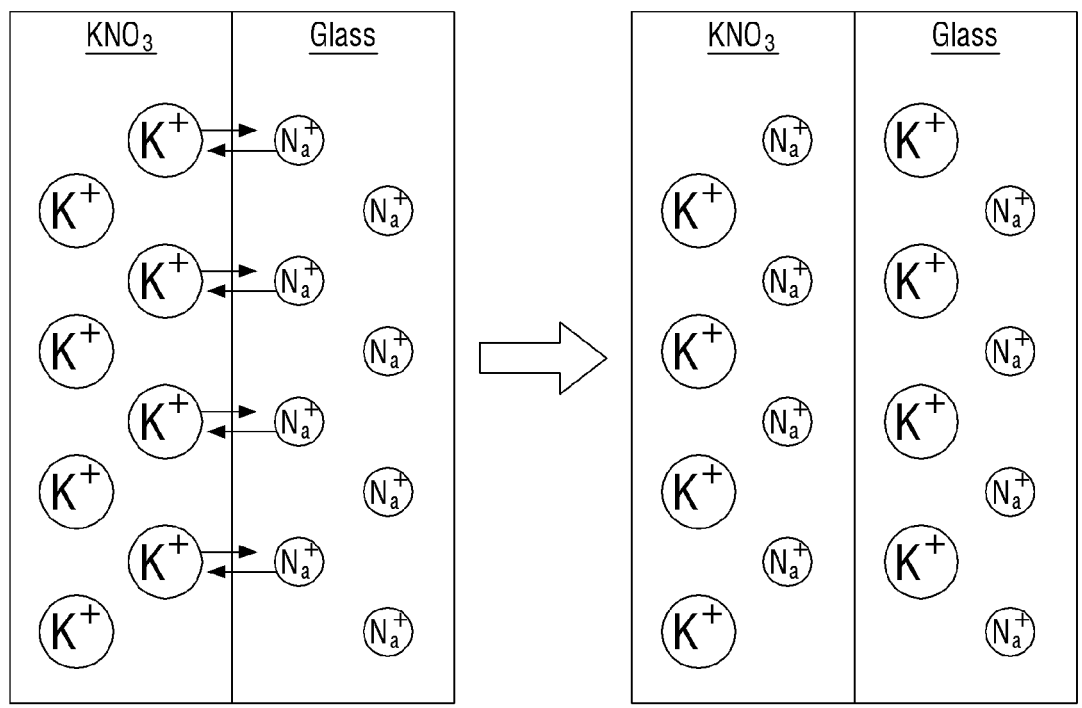
FIG. 4 is a schematic view illustrating an ion exchange process of a chemical strengthening step.

FIG. 4 is a schematic view illustrating an ion exchange process of a chemical strengthening step.

Referring to FIG. 4, the ion exchange process is a process of exchanging ions in the glass article 10 with other ions. Through the ion exchange process, ions on or near the surfaces US, RS, and SS of the glass article 10 may be replaced or exchanged with larger ions having the same valence or oxidation state.

T FIG. 4 illustrates an embodiment of an ion exchange process of exposing glass containing sodium (Na) ions to potassium (K) ions. In such an embodiment, when the glass containing sodium (Na) ions is exposed to potassium (K) ions by a method such as immersing the glass in a molten salt of potassium nitrate ($KNO_3$) contained in the glass substrate chemical strengthening furnace apparatus, sodium (Na) ions in the glass are discharged to the outside and potassium (K) ions may be replaced to the discharged site. The exchanged potassium (K) ions have an ionic radius larger than that of sodium (Na) ions to generate the compressive stress. The greater the amount of exchanged potassium (K) ions is, the greater the compressive stress become. Since the ion exchange is performed through the surfaces US and RS of the glass, the amount of potassium (K) ions on the surfaces US and RS of the glass may be greatest. Some of the exchanged potassium (K) ions diffuse into the glass to increase the depth of the compressive region, that is, the compressive depths DOC1 and DOC2, but the amount thereof may generally decrease as being further away from the surfaces US and RS. Thus, the glass may have a stress profile in which the compressive stresses CS1 and CS2 are the greatest at the surfaces US and RS and decrease inwardly. However, the embodiments are not limited to those described above, and the stress profile may be modified depending on the temperature, time, number of times, presence or absence of heat treatment, etc. of the ion exchange process.

In an embodiment, as described above, the ion exchange process of the chemical strengthening step may be performed by the method such as immersing the glass in the molten salt contained in the glass substrate chemical strengthening furnace apparatus. Hereinafter, an embodiment of the glass substrate chemical strengthening furnace apparatus used in the ion exchange process will be described in detail.

Figure 5:
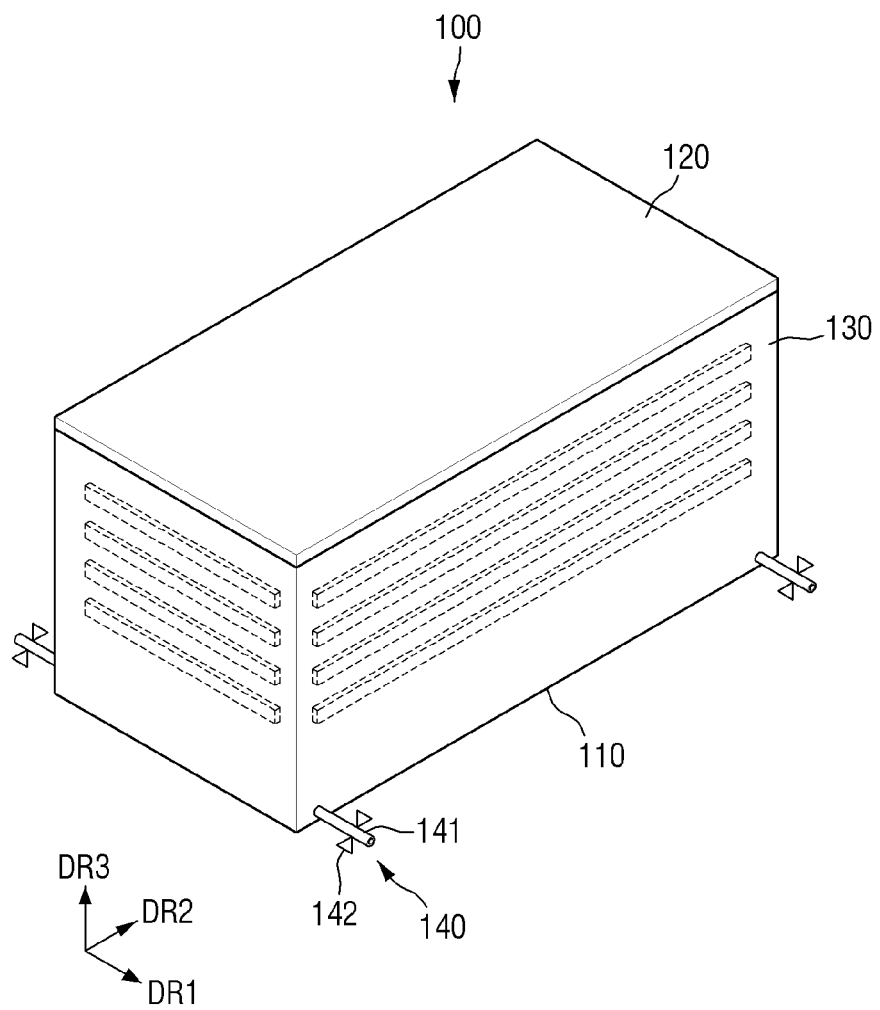
FIG. 5 is a perspective view of a glass substrate chemical strengthening furnace apparatus according to an embodiment.
Figure 6:
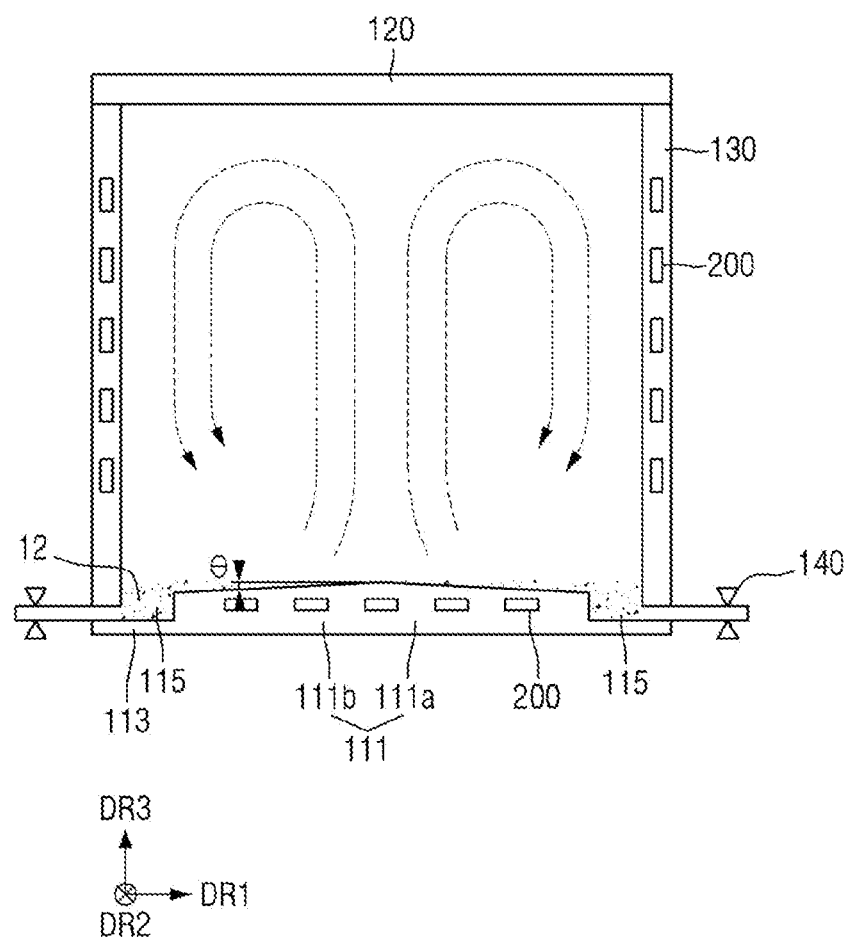
FIG. 6 is a cross-sectional schematic view of the glass substrate chemical strengthening furnace apparatus according to an embodiment.
Figure 7:
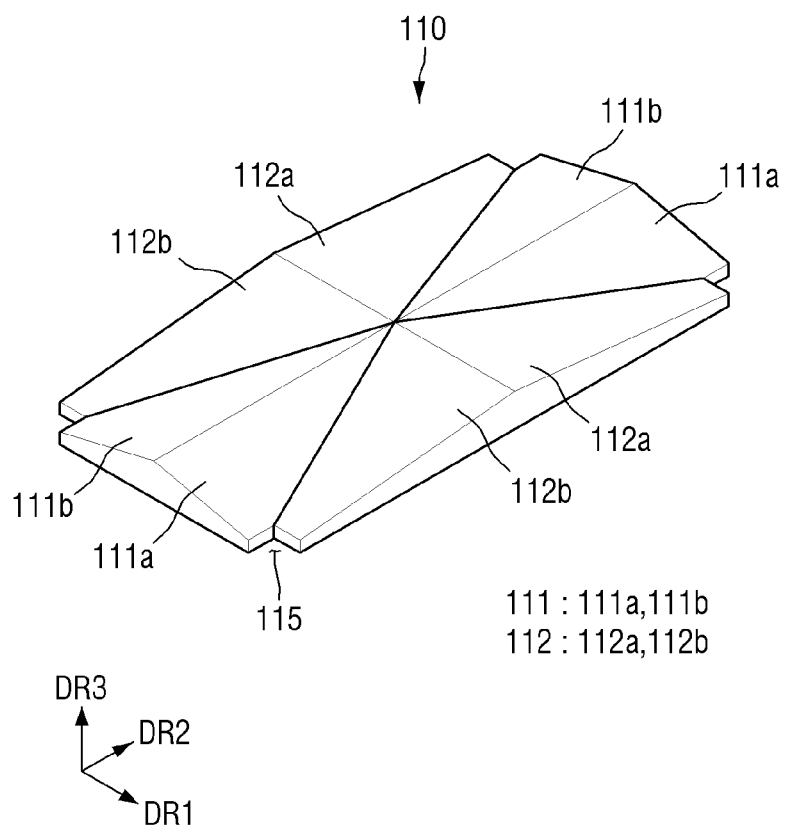
FIG. 7 is a perspective view of a bottom portion of the glass substrate chemical strengthening furnace apparatus according to an embodiment.

FIG. 5 is a perspective view of a glass substrate chemical strengthening furnace apparatus according to an embodiment. FIG. 6 is a cross-sectional schematic view of the glass substrate chemical strengthening furnace apparatus according to an embodiment. FIG. 7 is a perspective view of a bottom portion of the glass substrate chemical strengthening furnace apparatus according to an embodiment.

Referring to FIGS. 5 to 7, an embodiment of the glass substrate chemical strengthening furnace apparatus 100 is an apparatus for chemically strengthening glass, and for example, used to chemically strengthen ultra-thin glass through an ion exchange process. Hereinafter, for convenience of description, embodiment where chemical strengthening is performed by immersing the ultra-thin glass in a molten salt containing potassium nitrate ($KNO_3$) will be described in detail, but is not limited thereto.

In an embodiment of the glass substrate chemical strengthening furnace apparatus 100, a salt containing at least one selected from sodium (Na), potassium (K), rubidium (Rb), and cesium (Cs) ions is disposed. The salt in the glass substrate chemical strengthening furnace apparatus 100 may be heated by a heater 200 to become a molten salt. When the ultra-thin glass is immersed in the molten salt in the glass substrate chemical strengthening furnace apparatus 100, the ultra-thin glass may be chemically strengthened while the ion exchange process is performed.

The ultra-thin glass chemically strengthened in the glass substrate chemical strengthening furnace apparatus 100 may have a thin thickness, e.g., of about 100 µm or less, and may have high tensile stress due to the thin thickness thereof. When the ultra-thin glass is broken due to high tensile stress in a slow cooling process during or after the strengthening, the fine glass particles may be scattered in the glass substrate chemical strengthening furnace apparatus 100. The fine glass particles scattered in the glass substrate chemical strengthening furnace apparatus 100 may cause scratches and stabbed defects in another ultra-thin glass. Therefore, in an embodiment, a process of removing fine glass particles generated by breakage of the ultra-thin glass is desired as a post-treatment method to prevent such scratches and stabbed defects. In an embodiment, the glass substrate chemical strengthening furnace apparatus 100 may have a structure to minimize the occurrence of scratches and stabbed defects caused by the fine glass particles scattered in the glass substrate chemical strengthening furnace apparatus 100 by including a structure for collecting such fine glass particles.

In an embodiment, as shown in FIGS. 5 and 6, the glass substrate chemical strengthening furnace apparatus 100 may include a bottom portion 110, an upper portion 120 facing the bottom portion 110 and disposed at one side in a third direction DR3, a side wall 130 extended from an edge of the bottom portion 110 to the one side in the third direction DR3, a discharge unit 140 disposed in opposing side regions of the side wall 130 near the bottom portion 110, and a heater 200 disposed at the bottom portion 110 and the side wall 130 side. The bottom portion 110 and the side wall 130 may define a reaction space in the glass substrate chemical strengthening furnace apparatus 100.

The bottom portion 110 constitutes a lower inner surface of the glass substrate chemical strengthening furnace apparatus 100, and a planar shape thereof may be a rectangular shape including short sides extending in the first direction DR1 and long sides extending in the second direction DR2.

In an embodiment, as illustrated in FIGS. 6 and 7, the bottom portion 110 may include inclined portions 111 and 112 having an inclined upper surface and a collection portion 113 extending from the inclined portions 111 and 112 toward the side wall 130.

In an embodiment, as shown in FIGS. 6 and 7, the inclined portions 111 and 112 may include a first inclined portion 111 in which the upper surface is inclined and descends (i.e., inclined downward) at an inclination angle of 0° toward the first direction DR1 from a line region connecting midpoints of the short sides and a second inclined portion 112 in which the upper surface is inclined and descends (i.e., inclined downward) at an inclination angle of 0° toward the second direction DR2 from a line region connecting midpoints of the long sides. In an embodiment, the inclination angle θ of the upper surface may be equal to or less than about 45°. In such an embodiment, the inclination angle θ of the upper surface may be equal to or less than about 30°. In such an embodiment, the inclination angle θ of the upper surface may be equal to or less than about 20°. In such an embodiment, the inclination angle θ of the upper surface may be equal to or less than about 10°, but the invention is not limited thereto. The inclination angle θ of the upper surface of the inclined portions 111 and 112 may be uniform, but is not limited thereto and may have a different angle θ for each region.

The first inclined portion 111 may include a region 111a inclined downward to one side in the first direction DR1 and a region 111b inclined downward to the other side in the first direction DR1. The second inclined portion 112 may include a region 112a inclined downward to one side in the second direction DR2 and a region 112b inclined downward to the other side in the second direction DR2.

In a region where the first inclined portion 111 and the second inclined portion 112 are contacted to each other, a V-shaped valley may be defined by the upper surface of the first inclined portion 111 and the upper surface of the second inclined portion 112. The V-shaped valley may be inclined downward toward the collection portion 113 along an intersection line between the first inclined portion 111 and the second inclined portion 112. The collection portion 113 may be disposed at an outer end of the V-shaped valley. After the fine glass particles 12 generated in the chemical strengthening process descend to the bottom portion 110 side by specific gravity, the fine glass particles 12 may be induced toward the collection portion 113 side along the V-shaped valley.

The collection portion 113 may be disposed between the inclined portions 111 and 112 of the bottom portion 110 and the side wall 130. The upper surface of the collection portion 113 and the upper surfaces of the inclined portions 111 and 112 may be discontinuously disposed so that the collection portion 113 and the inclined portions 111 and 112 may form a step structure with a constant step height. The heater 200 may not be disposed inside the collection portion 113 or above and below the collection portion 113.

A collection groove 115 may be defined by an upper surface of the collection portion 113, side surfaces of the inclined portions 111 and 112 extending toward one side of the third direction DR3 from the upper surface of the collection portion 113, and an inner surface of the side wall 130 extending toward one side in the third direction DR3 from the upper surface of the collection portion 113. The fine glass particles 12 induced along the inclination of the bottom portion 110 may be collected in the collection groove 115. The height of the collection groove 115 may be the same as the step heights between the collection portion 113 and the inclined portions 111 and 112. In an embodiment, the height of the collection groove 115 may be about 0.2 times or less than the height of the side wall 130. In such an embodiment, the height of the collection groove 115 may be about 0.15 times or less than the height of the side wall 130. In such an embodiment, the height of the collection groove 115 may be about 0.1 times or less than the height of the side wall 130. In such an embodiment, the height of the collection groove 115 may be about 0.05 times or less than the height of the side wall 130, but the invention is not limited thereto.

The heater 200 that generates heat for heat treatment may be disposed in the inclined portions 111 and 112. The heater 200 may be disposed in the inclined portions 111 and 112 or adjacent to the upper and lower portions thereof, or may be integrated with the inclined portions 111 and 112, but is not limited thereto, and may be adjacent to the inclined portions 111 and 112 in various forms. The heater 200 may include a heating device such as a heating wire or a thermoelectric element having a resistance.

The upper portion 120 is disposed on one side in the third direction DR3 of the bottom portion 110 of the glass substrate chemical strengthening furnace apparatus 100, and may be provided in a form of a door that may be opened and closed. The entire upper portion 120 may be opened or closed in a sliding type or a hinged type, but is not limited thereto. Alternatively, the upper portion 120 may include a plurality of divided elements or parts that may be opened or closed by a sliding type or a hinged type. The upper portion 120 may seal the inside of the glass substrate chemical strengthening furnace apparatus 100 from the outside. While chemical strengthening of the glass substrate is performed in the glass substrate chemical strengthening furnace apparatus 100, the upper portion 120 may be closed and the inside of the glass substrate chemical strengthening furnace apparatus 100 may be sealed.

The side wall 130 may define a side wall of the glass substrate chemical strengthening furnace apparatus 100, and may extend from one edge of the bottom portion 110 to one side of the third direction DR3.

The side wall 130 and the bottom portion 110 may be separately manufactured and combined with each other. Alternatively, the side wall 130 and the bottom portion 110 may be integrally formed as a single unitary unit. The heater 200 that generates heat for heat treatment may be disposed in or on the side wall 130. In an embodiment, the heater 200 may be disposed in the side wall 130. In an alternative embodiment, the heater 200 may be disposed adjacent to the inner side or the outer side of the side wall 130 or may be integrated with the side wall 130, but is not limited thereto and may be disposed adjacent to the side wall 130 in various forms. However, the heater 200 disposed on the side wall 130 may not be disposed adjacent to the collection portion 113 side. The heater 200 may include a heating device such as a heating wire or a thermoelectric element having a resistance.

Side corner regions at a lower end of the inner surface of the side wall 130 may define the collection groove 115. At least one of the side wall 130 or the collection portion 113 adjacent to the collection groove 115 may be disposed with a discharge unit 140 configured to discharge a material in the glass substrate chemical strengthening furnace apparatus 100 to an outside. The discharge unit 140 may be disposed through the side wall 130, but is not limited thereto. Alternatively, the discharge unit 40 may be installed to penetrate through or inserted into the collection portion 113. In an embodiment, a single discharge unit 140 may be installed to correspond to each collection groove 115, but is not limited thereto. Alternatively, and a plurality of discharge units 140 may be installed to correspond to one collection groove 115.

The discharge unit 140 may include a drain 141 configured to discharge the material in the reaction space to the outside and a valve 142 for controlling a flow in the drain 141. The drain 141 is a passage configured to connect the reaction space with the outside and move the material, and the valve 142 may be a device for controlling the discharge of the material through the drain 141. The drain 141 may have a reaction space side inlet and an outer side outlet. The reaction space side inlet of the drain 141 may be disposed adjacent to the collection portion 113.

Based on the operation of the discharge unit 140, when the valve 142 is opened, the material in the glass substrate chemical strengthening furnace apparatus 100 may be discharged to the outside through the drain 141, and when the valve 142 is closed, the discharge of the material may be stopped.

The heater 200 may generate heat for heat treatment. A plurality of heaters 200 may be disposed. In an embodiment, the heater 200 may be disposed at the bottom portion 110 or the sidewall 130 side to maintain an appropriate temperature of the glass substrate chemical strengthening furnace apparatus 100 as described above. In the ion exchange process, a solid salt may be provided in the glass substrate chemical strengthening furnace apparatus 100, and the heat provided from the heater 200 may melt the solid salt and maintain the temperature of the salt in a molten state.

In an embodiment, the heat provided from the heater 200 may maintain the temperature of the molten salt by convecting the molten salt. The amount of heat generated from the heater 200 may generally decrease as being further away from the heater 200. The molten salt in a region close to the heater 200 has a high temperature, and as the distance from the heater 200 increases, the temperature decreases, resulting in a temperature difference in the molten salt. In this case, the molten salt at a relatively high temperature ascends upward, and the molten salt at a low temperature descends downward to induce a convection phenomenon. Through the convection of the molten salt, the temperature of the entire molten salt in the glass substrate chemical strengthening furnace apparatus 100 may be uniformly maintained.

In such an embodiment, when the fine glass particles 12 exist in the molten salt, the fine glass particles 12 may be moved together with the molten salt which is convected. As described above, when the fine glass particles 12 are scattered, the fine glass particles 12 may adversely affect the ultra-thin glass, such as scratches or stabbed defects. Therefore, in such an embodiment, the heater 200 may not be disposed or installed in a region near the place where the fine glass particles 12 are accumulated.

In an embodiment, the heater 200 may be disposed around the collection groove 115 where the fine glass particles 12 are accumulated. That is, the heater 200 may not be disposed in the region of the side wall 130 defining the collection groove 115, and the region of the collection portion 113 and the inclined portions 111 and 112 of the bottom portion 110. In such an embodiment, as described above, the fine glass particles 12 generated in the ion exchange process of the ultra-thin glass may be induced to the collection groove 115, and when the convection of the molten salt is active in the collection groove 115, the fine glass particles 12 may be scattered. If the heater 200 is installed in the region of the side wall 130 defining the collection groove 115, the fine glass particles 12 accumulated in the collection groove 115 may be scattered by convection of the molten salt due to heat generated from the heater 200. The scattered fine glass particles 12 may cause scratches on the surface of the ultra-thin glass, and may cause stabbed defects. Accordingly, the heater 200 may not be disposed near the collection groove 115 to prevent the fine glass particles 12 from being circulated by convection. In an embodiment, the heater 200 may not be disposed at the side wall 130 and the bottom portion 110 defining the collection groove 115. In such an embodiment, the heater 200 may be spaced apart from the collection groove 115 with a predetermined direction, which is determined not to induce a convection near the collection groove 115.

In an embodiment, the temperature of each heater 200 may be controlled together by a single controller (not illustrated), but is not limited thereto. Alternatively, the temperature of the heater 200 may be controlled separately or independently of each other by different controllers (not illustrated).

Figure 8:
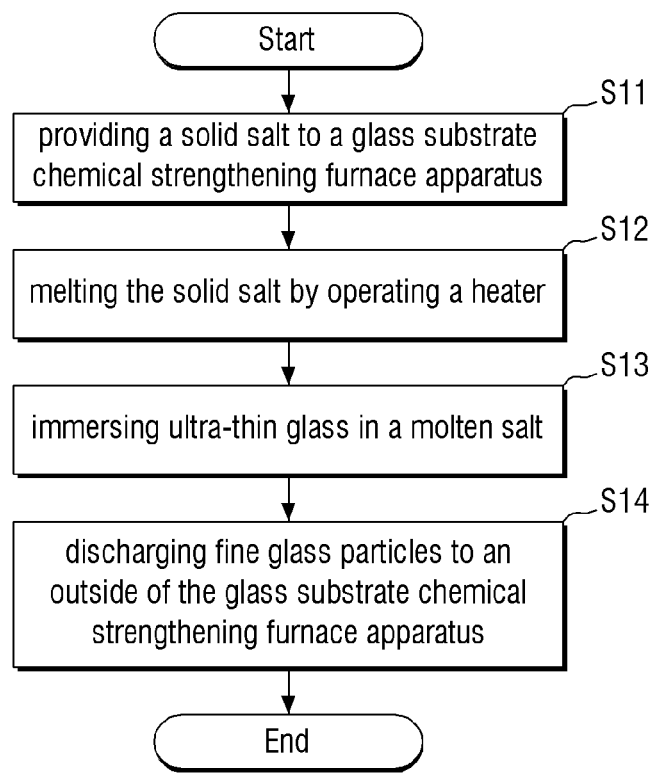
FIG. 8 is a flowchart of a glass strengthening method according to an embodiment.
Figure 9:
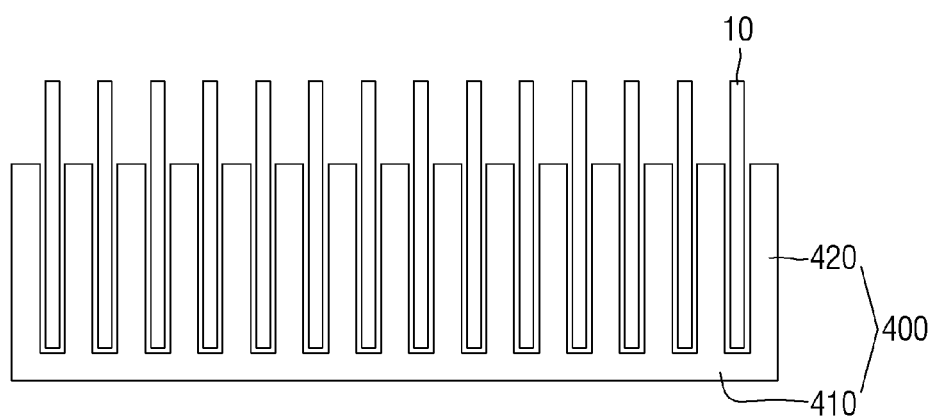
FIG. 9 is a schematic view of a cassette used for glass strengthening.
Figure 10:
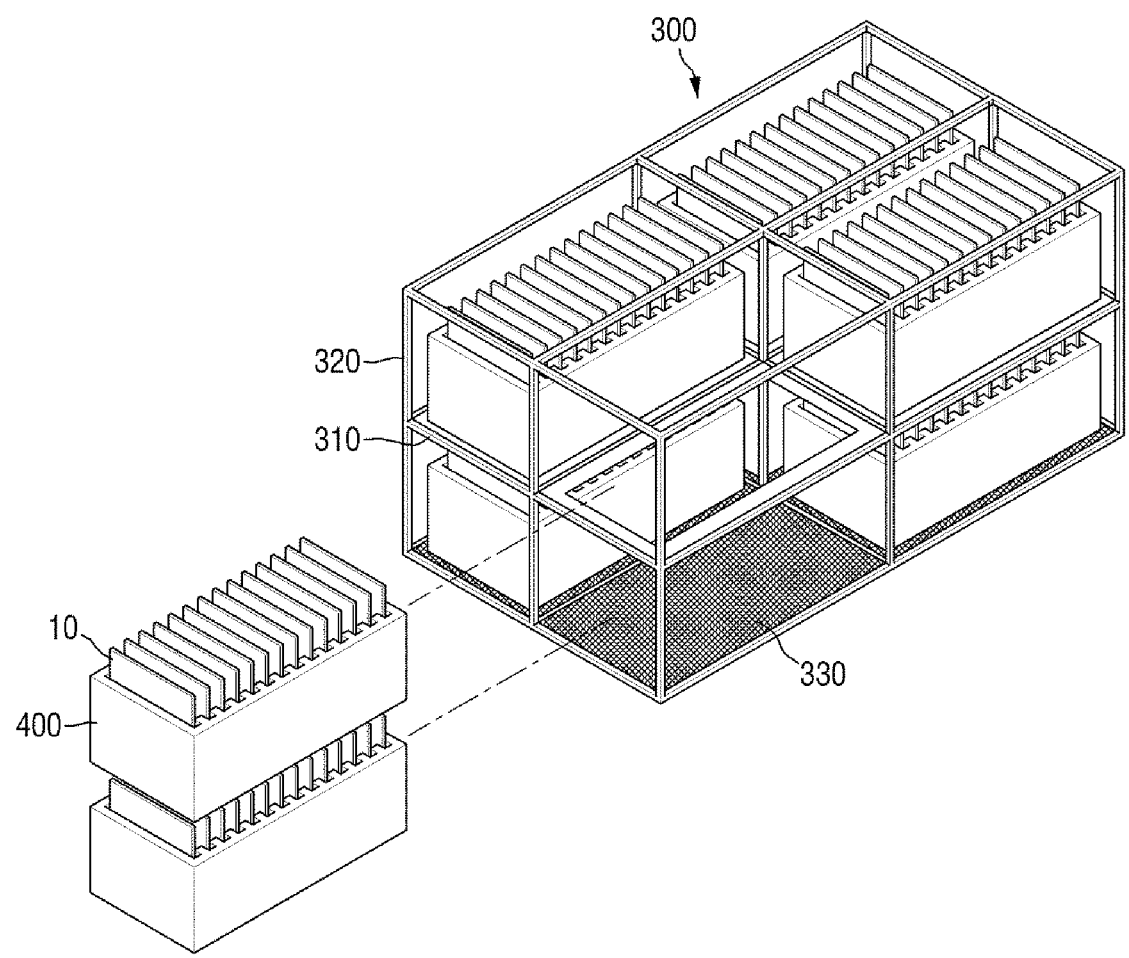
FIG. 10 is a perspective view of a hanger used for glass strengthening.
Figure 11:
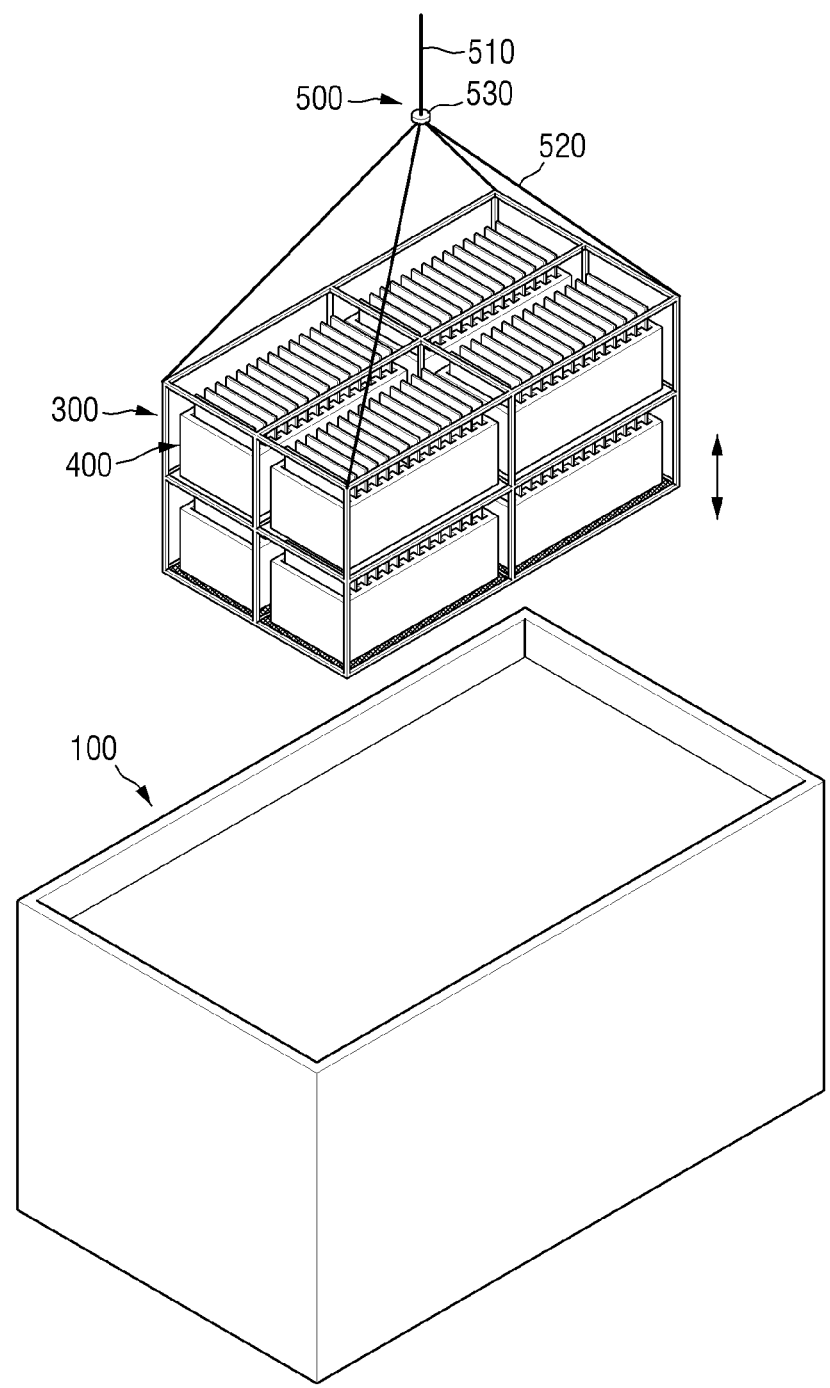
FIG. 11 is a schematic view illustrating a process of immersing and taking out ultra-thin glass in a molten salt.
Figure 12:
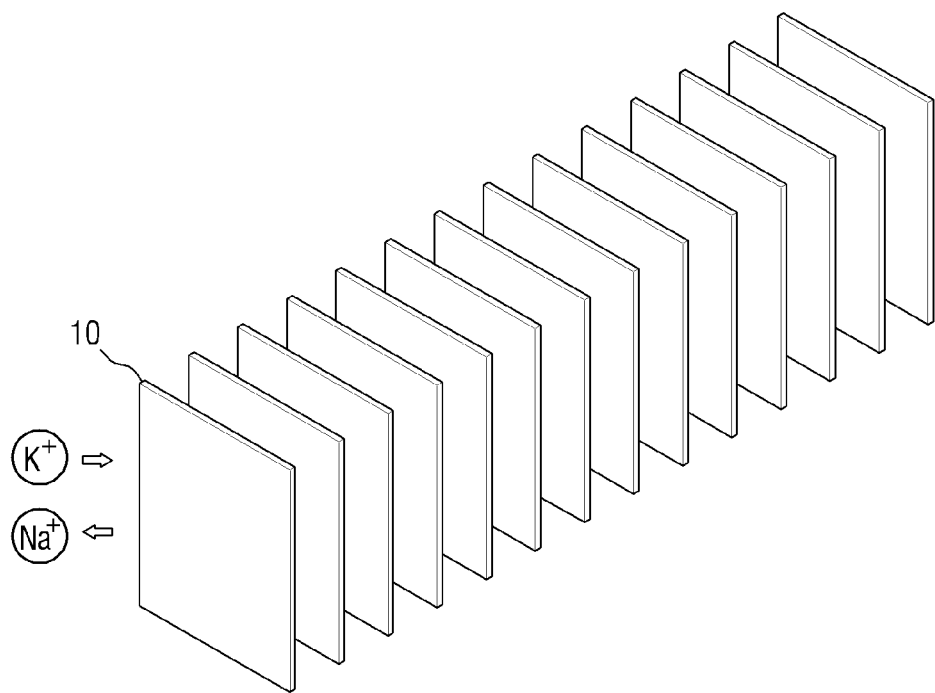
FIG. 12 is a schematic view illustrating an ion exchange process of the ultra-thin glass.

FIG. 8 is a flowchart of a glass strengthening method according to an embodiment. FIG. 9 is a schematic view of a cassette used for glass strengthening. FIG. 10 is a perspective view of a hanger used for glass strengthening. FIG. 11 is a schematic view illustrating a step of immersing and taking out ultra-thin glass in a molten salt. FIG. 12 is a schematic view illustrating an ion exchange process of the ultra-thin glass.

Referring to FIG. 8, an embodiment of a glass strengthening method includes providing a solid salt to a glass substrate chemical strengthening furnace apparatus (S11), melting the solid salt by operating a heater of the glass substrate chemical strengthening furnace apparatus (S12), immersing ultra-thin glass in a molten salt (S13) in the glass substrate chemical strengthening furnace apparatus, and discharging fine glass particles to an outside of the glass substrate chemical strengthening furnace apparatus (S14).

In such an embodiment, as shown in FIGS. 9 and 10, the immersing the ultra-thin glass in the molten salt (S13) may include preparing ultra-thin glass 10, and immersing and then taking out the ultra-thin glass 10 by loading the ultra-thin glass 10 on a cassette 400 and a hanger 300.

In such an embodiment, the preparing the ultra-thin glass may include preparing a glass composition and molding the glass composition.

The glass composition may include at least one selected from various compositions known in the art. In an embodiment, the glass composition includes silicon dioxide ($SiO_2$) as a main component. In such an embodiment, the glass composition may contain components such as aluminum oxide ($Al_2O_3$), lithium oxide ($LiO_2$), and sodium oxide ($Na_2O$), but is not limited thereto, and may further selectively include other components. In an embodiment, the glass composition may include a glass ceramic containing alkali aluminosilicate.

The glass composition may be molded into a glass shape by at least one of various methods known in the art. In one embodiment, for example, the glass composition may be molded by a float process, a fusion draw process, a slot draw process, or the like.

Hereinafter, the process immersing and then taking out the ultra-thin glass 10 in the molten salt by loading the ultra-thin glass 10 on the cassette 400 and the hanger 300 will be described in detail with reference to FIGS. 9 to 11.

In FIG. 9, the cassette 400 on which the ultra-thin glass 10 is loaded is illustrated. Referring to FIG. 9, the cassette 400 may provide an accommodation space in which the ultra-thin glass 10 is loaded. The cassette 400 may include a lower supporter 410 and a partition wall 420. In an embodiment, the accommodation space in which the ultra-thin glass 10 is loaded may be defined by one side of one partition wall 420, the other side of another partition wall 420 adjacent to the one partition wall 420 in a predetermined direction, and an upper surface of the lower supporter 410 connecting the two partition walls 420 described above. In an embodiment, as shown in FIG. 9, 14 cassettes 400 may accommodate the ultra-thin glass 10, but the invention is not limited thereto.

The height of the partition wall 420 of the cassette 400 may be less than the length of the long side of the ultra-thin glass 10. However, the height of the partition wall 420 may have a height determined in a way such that a contact between the ultra-thin glasses 10 loaded in the adjacent accommodation spaces to each other does not occur.

In FIG. 10, the hanger 300 on which the cassette 400 loaded with the ultra-thin glass 10 is loaded is illustrated. Referring to FIG. 10, the hanger 300 may provide an accommodation space in which the cassette 400 is loaded. FIG. 10 illustrates an embodiment where the hanger 300 configured to load eight cassettes 400 including a frame having three stages in a horizontal direction and three stages in a vertical direction, but the invention is not limited thereto. In an embodiment, the hanger 300 may include a horizontal frame 310, a vertical frame 320, and a wire mesh 330. The space in which the cassette 400 is loaded may be an internal space of each rectangular parallelepiped structure formed by the horizontal frame 310 and the vertical frame 320. The cassette 400 may be supported by the horizontal frame 310 and loaded on the hanger.

The wire mesh 330 may be installed below the hanger 300. In an embodiment, the wire mesh 330 is a mesh net including or made of iron and may be installed to be coupled to the lowermost horizontal frame 310. The wire mesh 330 may filter glass fragments that may occur during chemical strengthening. However, the wire mesh 300 may not effectively filter the fine glass particles, which is smaller than the glass fragments, generated from the ultra-thin glass 10.

Referring to FIG. 11, the process of immersing and then taking out the ultra-thin glass 10 in the molten salt by loading the ultra-thin glass 10 on the cassette 400 and the hanger 300 may be performed by a method of loading on the hanger 300 the cassette 400 where the ultra-thin glass 10 is loaded and immersing the hanger 300 in the glass substrate chemical strengthening furnace apparatus 100 in which the molten salt is contained and then taking out the hanger 300 after a predetermined time. The hanger 300 may reciprocate up and down by a cable portion 500 which is connected to the hanger 300 and located at an upper portion thereof.

The cable portion 500 includes a center cable 510, a branch cable 520 separated from the center cable 510, and a bundle unit 530 connecting the center cable 510 and the branch cable 520 to each other. Each branch cable 520 is connected to the hanger 300, and the center cable 510 may be moved up and down by a lifting device (not illustrated). When the hanger 300 is immersed in the molten salt accommodated in the glass substrate chemical strengthening furnace apparatus 100, the cable portion 500 may descend, and when the hanger 300 is taken out from the molten salt, the cable portion 500 may ascend. While the hanger 300 loading the cassette 400 on which the ultra-thin glass 10 is loaded is immersed in the molten salt, chemical strengthening through the ion exchange process may be performed.

Referring to FIG. 12, the chemical strengthening may be performed through the ion exchange process. The ion exchange process is a process of exchanging ions in the ultra-thin glass 10 with other ions. The ion exchange process may be performed two or more times. In one embodiment, for example, the ion exchange process may include a first ion exchange process and a second ion exchange process. Each ion exchange process may be performed simultaneously with respect to a plurality of glasses 10. In an embodiment, the plurality of glasses 10 may be immersed in the molten salt accommodated in one glass substrate chemical strengthening furnace apparatus 100 so that ion exchange may be simultaneously performed in the plurality of glasses 10.

Through the ion exchange process, ions on or near the surface of the glass 10 may be replaced or exchanged with larger ions having the same valence or oxidation state. In one embodiment, for example, where the glass 10 contains monovalent alkali metals such as lithium (Li), sodium (Na), potassium (K), and rubidium (Rb) ions, the monovalent cations on the surface thereof may be exchanged with sodium (Na), potassium (K), rubidium (Rb), and cesium (Cs) ions having a larger ionic radius.

The chemical strengthening may be wet chemical strengthening of a single salt or mixed salt by an immersion method. In an embodiment, the chemical strengthening may be performed by immersing the glass 10 in the molten salt accommodated in the glass substrate chemical strengthening furnace apparatus 100 and containing an alkali metal ion salt, and the alkali metal may include at least one of sodium (Na), potassium (K), rubidium (Rb), and cesium (Cs) ions. In such an embodiment, the chemical strengthening may be performed by the molten salt of sodium (Na), potassium (K), rubidium (Rb), and cesium (Cs) ions. The wet chemical strengthening may be effective in terms of mass production, and may implement more uniform strengthening characteristics.

In an embodiment, the chemical strengthening may be performed by using a molten salt such as potassium nitrate ($KNO_3$) or sodium nitrate ($NaNO_3$) in the range of 1 hour to 30 hours at a molten salt temperature in a range of about 300° C. to 500° C. The chemical strengthening may be performed by exchanging alkali ions on the surface layer of the glass 10 with ions having a large ionic radius.

Through the ion exchange process, ions on or near the surfaces US and RS of the ultra-thin glass 10 may be replaced or exchanged with larger ions having the same valence or oxidation state. In one embodiment, for example, where the glass contains monovalent alkali metal ions such as lithium (Li), sodium (Na), potassium (K), and rubidium (Rb) ions, monovalent cations on the surface thereof may be exchanged with sodium (Na), potassium (K), rubidium (Rb), and cesium (Cs) ions having a larger ionic radius.

When the glass containing sodium (Na) ions is exposed to potassium (K) ions by a method such as immersing the glass in a molten salt containing potassium nitrate ($KNO_3$), sodium (Na) ions in the glass are discharged to the outside and potassium (K) ions may be replaced to the discharged site. The exchanged potassium (K) ions have an ionic radius larger than that of sodium (Na) ions to generate the compressive stress. The greater the amount of exchanged potassium (K) ions is, the greater the compressive stress become. Since the ion exchange is performed through the surface of the glass, the amount of potassium (K) ions on the glass surface may be the greatest. Some of the exchanged potassium (K) ions diffuse into the glass to increase the depth of the compressive region, that is, the compressive depths DOC1 and DOC2, but the amount thereof may generally decrease as being further away from the surfaces. Accordingly, the glass may have a stress profile in which the compressive stresses CS1 and CS2 are the greatest at the surfaces and decrease inwardly. However, the embodiments are not limited to those described above, and the stress profile may be modified depending on the temperature, time, number of times, presence or absence of heat treatment, etc. of the ion exchange process.

After the immersing of the ultra-thin glass in the molten salt (S13), the discharging of the fine glass particles (S14) may be performed. In an embodiment, as described above, when the ultra-thin glass 10 is chemically strengthened through the ion exchange process, some of the ultra-thin glass 10 may be broken and thus, the fine glass particles 12 may be scattered in the molten salt. The fine glass particles 12 are preferably removed because the fine glass particles 12 may cause scratches or stabbed defects on another ultra-thin glass 10.

The fine glass particles 12 in the molten salt may descend to the bottom portion 110 side due to a difference in specific gravity from the molten salt. Some of the fine glass particles 12 descending to the bottom portion 110 side may move toward the collection groove 115 along the inclined surface, but others may ascend again according to the convection of the molten salt. When such a phenomenon is repeated, the fine glass particles 12 may be induced and collected to the collection groove 115. In such an embodiment, as described above, the heater 200 is not disposed near the collection groove 115, such that the convection may not occur near the collection groove 115. Therefore, the fine glass particles 12 collected in the collection groove 115 may not ascend due to the convection of the molten salt, but may be deposited in the collection groove 115.

The fine glass particles 12 deposited in the collection groove 115 may be discharged to the outside through the discharge unit 140. The discharge unit 140 may include a drain 141 and a valve 142 for controlling the operation of the drain 141. In an embodiment, the fine glass particles 12 deposited in the collection groove 115 may be discharged to the outside through the drain 141 when the valve 142 is opened. When the fine glass particles 12 are discharged, the molten salt may be discharged together.

The ion exchange process may be repeated several times with a same molten salt. The discharge of the fine glass particles 12 may be performed between the repeated ion exchange processes, or periodically performed in the middle of the ion exchange process, but is not limited thereto. Alternatively, the discharge of the fine glass particles 12 may be aperiodically or selectively performed depending on the deposited amount of the fine glass particles 12.

An embodiment of the glass substrate chemical strengthening furnace apparatus 100 may have a structure to minimize an effect due to the fine glass particles 12 that may cause scratches or stabbed defects on another ultra-thin glass 10 in the ion exchange process of the chemical strengthening step of the ultra-thin glass 10. Accordingly, in such an embodiment, the occurrence of scratches and stabbed defects caused by the fine glass particles scattered in the glass substrate chemical strengthening furnace apparatus 100 may be substantially minimized or effectively prevented.

Figure 13:
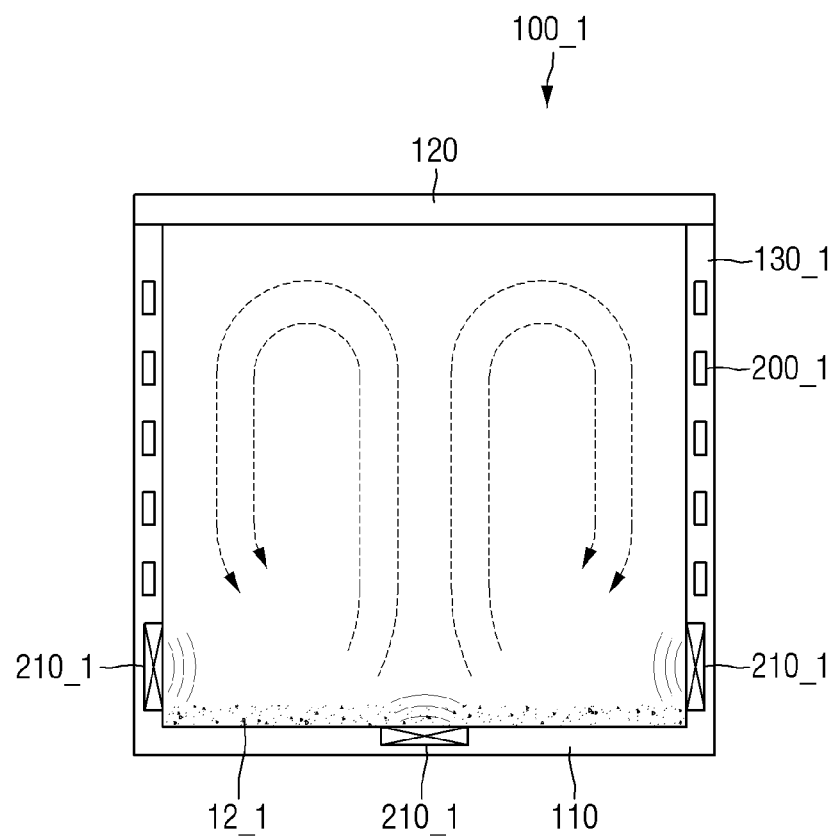
FIG. 13 is a schematic view of a glass substrate chemical strengthening furnace apparatus according to an alternative embodiment.

FIG. 13 is a schematic view of a glass substrate chemical strengthening furnace apparatus according to an alternative embodiment.

An embodiment of the glass substrate chemical strengthening furnace apparatus 100_1 shown in FIG. 13 is substantially the same as the embodiments of the glass substrate chemical strengthening furnace apparatus 100 described above with reference to FIG. 6, except that a bottom portion 110_1 does not include an inclination, a plurality of heaters 200_1 is disposed in a side wall 130-1 or adjacent to the side wall 130_1, but does not exist inside the bottom portion 110_1 or at upper and lower sides of the bottom portion 110_1, the collection groove 115 and the discharge unit 140 do not exist, and a plurality of ultrasonic generators 210_1 are provided at the bottom portion 110_1 and a lower end of the side wall 130_1 to provide ultrasonic waves to a reaction space. The same or like elements shown in FIG. 13 have been labeled with the same reference characters as used above to describe the embodiments of the glass substrate chemical strengthening furnace apparatus shown in FIG. 6, and any repetitive detailed description thereof will hereinafter be omitted or simplified.

In such an embodiment, fine glass particles 12_1 may be deposited on the upper surface of the bottom portion 110_1 due to a difference in specific gravity from the molten salt. The ultrasonic generator 210_1 may be located inside the bottom portion 110_1, in an adjacent region of the bottom portion 110_1, or at a lower end of the side wall 130_1. The ultrasonic generators 210_1 may be spaced apart from each other at intervals of about 45 centimeters (cm) to about 55 cm in a second direction DR2, but are not limited thereto. The ultrasonic waves may ensure temperature homogeneity of the molten salt without affecting the convection of the molten salt. In such an embodiment, the glass substrate chemical strengthening furnace apparatus 100_1 generates ultrasonic waves using the ultrasonic generators 210_1 located at the bottom portion 110_1 and the lower end of the side wall 130_1 to ensure temperature homogeneity of the molten salt while minimizing the behavior of the fine glass particles 12_1 deposited on the upper surface of the bottom portion 110_1.

The molten salt may be exchanged after multiple uses. The fine glass particles 12_1 may be removed together during exchange of the molten salt.

In such an embodiment, the glass substrate chemical strengthening furnace apparatus 100_1 may have a structure to minimize an effect due to the fine glass particles 12_1 that may cause scratches or stabbed defects on another ultra-thin glass 10_1 in the ion exchange process of the chemical strengthening step of the ultra-thin glass 10_1. Accordingly, in such an embodiment, the occurrence of scratches and stabbed defects caused by the fine glass particles 12_1 scattered in the glass substrate chemical strengthening furnace apparatus 100_1 may be substantially minimized or effectively prevented.

Figure 14:
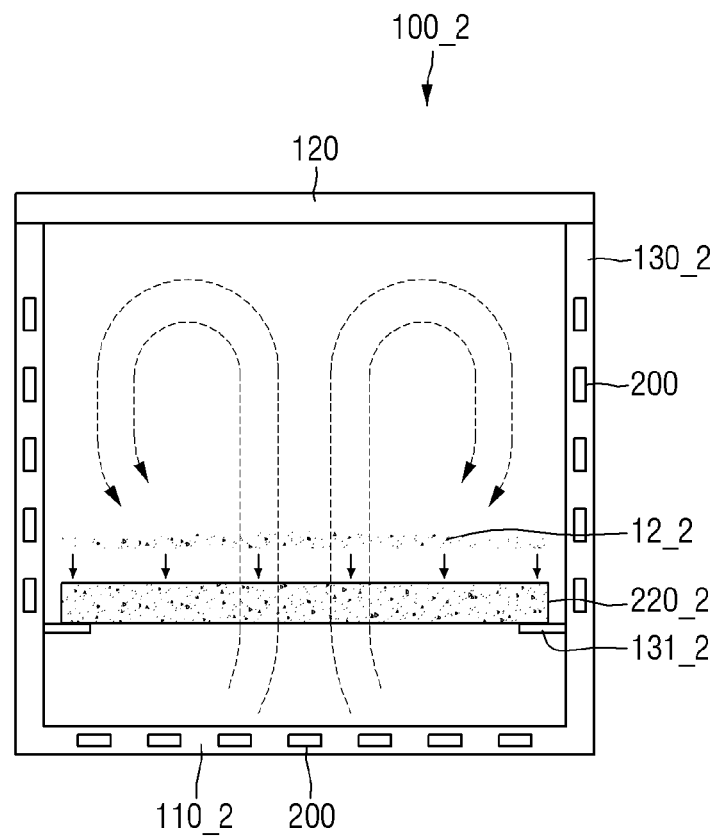
FIG. 14 is a schematic view of a glass substrate chemical strengthening furnace apparatus according to another alternative embodiment.

FIG. 14 is a schematic view of a glass substrate chemical strengthening furnace apparatus according to another alternative embodiment.

An embodiment of the glass substrate chemical strengthening furnace apparatus 100_2 shown in FIG. 14 is substantially the same as the embodiments of the glass substrate chemical strengthening furnace apparatus 100 described above with reference to FIG. 6, except that the collection groove 115 and the discharge unit 140 do not exist and a porous ceramic filter 220_2 is provided in a reaction space of the glass substrate chemical strengthening furnace apparatus 100_2. The same or like elements shown in FIG. 14 have been labeled with the same reference characters as used above to describe the embodiments of the glass substrate chemical strengthening furnace apparatus shown in FIG. 6, and any repetitive detailed description thereof will hereinafter be omitted or simplified.

In an embodiment, the porous ceramic filter 220_2 may include fine pores to adsorb and remove fine glass particles 12_2. The porous ceramic filter 220_2 may perform a filtering function even at a high temperature at which chemical strengthening is performed in the glass substrate chemical strengthening furnace apparatus 100_2. In an embodiment, the porous ceramic filter 220_2 may be formed by mixing glass powder, carbon (C), and water and heat-treating the mixture at a temperature of about 700° C. to about 800° C.

The porous ceramic filter 220_2 may be supported by a supporter 131_2 located on the inner side of the side wall 130_2 in the glass substrate chemical strengthening furnace apparatus 100_2 to be located at a distance from the upper surface of a bottom portion 110_2. Therefore, the fine glass particles 12_2 scattered by the convection of the molten salt may be effectively adsorbed and removed by the porous ceramic filter 220_2. When a large amount of fine glass particles 12_2 is adsorbed on the porous ceramic filter 220_2, the porous ceramic filter 220_2 may be replaced with a new porous ceramic filter 220_2 to effectively perform a filtering function.

In such an embodiment, the glass substrate chemical strengthening furnace apparatus 100_2 may have a structure to minimize an effect due to the fine glass particles 12_2 that may cause scratches or stabbed defects on another ultra-thin glass 10_2 in the ion exchange process of the chemical strengthening step of the ultra-thin glass 10_2. Accordingly, in such an embodiment, the occurrence of scratches and stabbed defects caused by the fine glass particles 12_2 scattered in the glass substrate chemical strengthening furnace apparatus 100_2 may be substantially minimized or effectively prevented.

Figure 15:
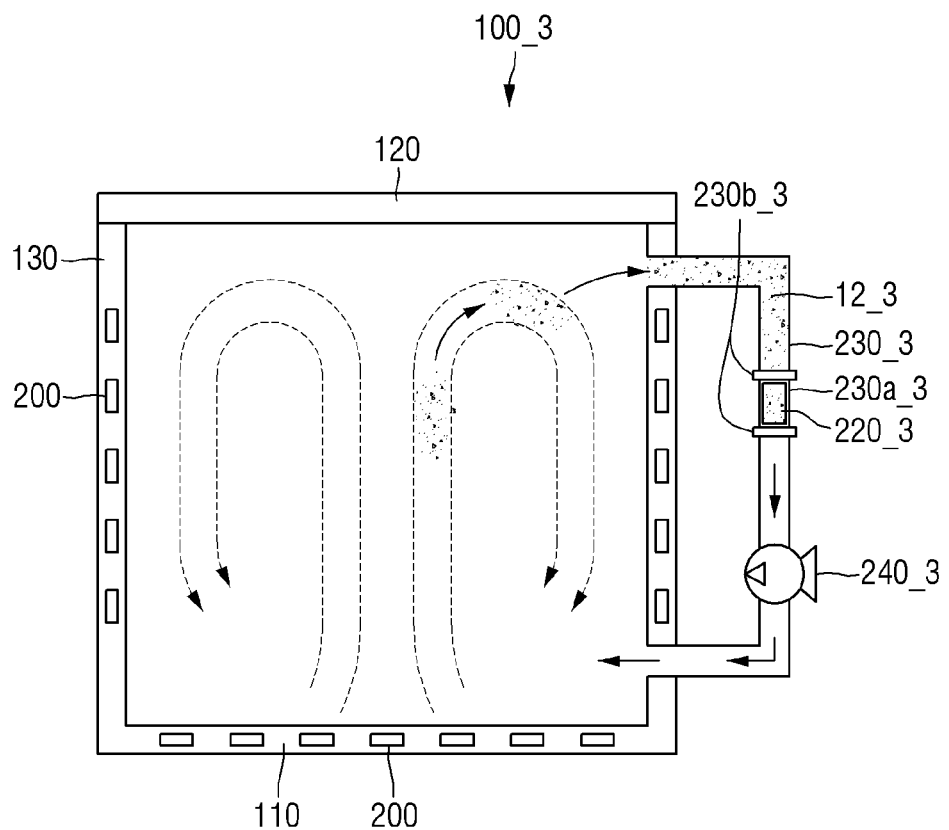
FIG. 15 is a schematic view of a glass substrate chemical strengthening furnace apparatus according to another alternative embodiment.
Figure 15:
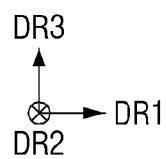

FIG. 15 is a schematic view of a glass substrate chemical strengthening furnace apparatus according to another alternative embodiment.

An embodiment of the glass substrate chemical strengthening furnace apparatus 100_3 shown in FIG. 15 is substantially the same as the embodiments of the glass substrate chemical strengthening furnace apparatus 100 described above with reference to FIG. 6, except that the collection groove 115 and the discharge unit 140 do not exist and an external pipe 230_3 connected with the inside of the glass substrate chemical strengthening furnace apparatus 100_3 and including a porous ceramic filter 220_3 and a circulation pump 240_3 is provided. The same or like elements shown in FIG. 15 have been labeled with the same reference characters as used above to describe the embodiments of the glass substrate chemical strengthening furnace apparatus shown in FIG. 6, and any repetitive detailed description thereof will hereinafter be omitted or simplified.

In an embodiment, the external pipe 230_3 may be connected to the circulation pump 240_3. The circulation pump 240_3 may suction the molten salt in the glass substrate chemical strengthening furnace apparatus 100_3 from a first inlet of the outer pipe 230_3 to discharge the molten salt to a second inlet. In such an embodiment, the circulation pump 240_3 may generate a flow toward the second inlet from the first inlet of the outer pipe 230_3. In such an embodiment the first inlet of the outer pipe 230_3 may be located above the second inlet. In such an embodiment, a distance (or height) of the first inlet of the outer pipe 230_3 from the bottom portion 110 is greater than a distance (or height) of the second inlet of the outer pipe 230_3 from the bottom portion 110.

The porous ceramic filter 220_3 may be located in a connection pipe 230a_3 of the external pipe 230_3. The connection pipe 230a_3 including the porous ceramic filter 220_3 may be connected to the external pipe 230_3 by a pipe coupler 230b_3. When a large amount of fine glass particles 12_3 are adsorbed on the porous ceramic filter 220_3, the pipe coupler 230b_3 may be released to replace the porous ceramic filter 220_3 in the connection pipe 230a_3 to effectively perform a filtering function. In an embodiment, the molten salt may pass through the porous ceramic filter 220_3 and then pass through the circulation pump 240_3, but is not limited thereto. In such an embodiment, the porous ceramic filter 220_3 is substantially the same as that of the embodiment described above with reference to FIG. 14, and any repetitive detailed description thereof will be omitted.

In such an embodiment, the glass substrate chemical strengthening furnace apparatus 100_3 may have a structure to minimize an effect on the fine glass particles 12_3 that may cause scratches or stabbed defects on another ultra-thin glass 10_3 in the ion exchange process of the chemical strengthening step of the ultra-thin glass 10_3. Accordingly, in such an embodiment, the occurrence of scratches and stabbed defects caused by the fine glass particles 12_3 scattered in the glass substrate chemical strengthening furnace apparatus 100_3 may be substantially minimized or effectively prevented.

Figure 16:
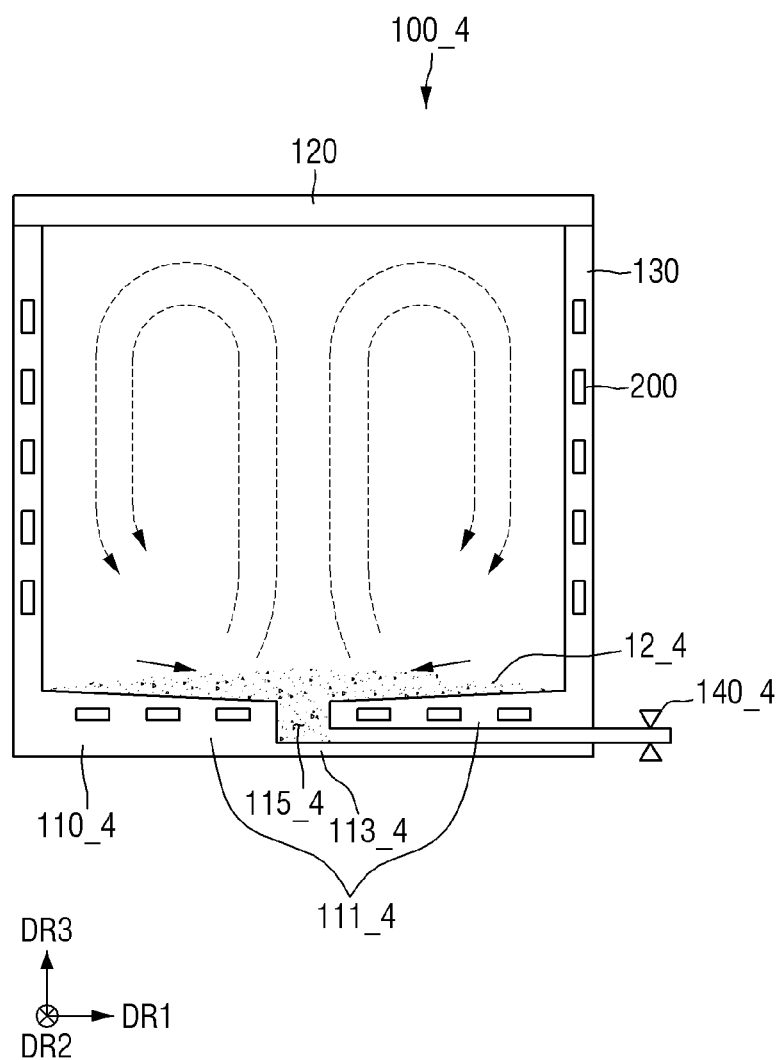
FIG. 16 is a schematic view of a glass substrate chemical strengthening furnace apparatus according to another alternative embodiment.

FIG. 16 is a schematic view of a glass substrate chemical strengthening furnace apparatus according to another alternative embodiment.

An embodiment of the glass substrate chemical strengthening furnace apparatus 100_4 shown in FIG. 16 is substantially the same as the embodiment of the glass substrate chemical strengthening furnace apparatus 100 described above with reference to FIG. 6, except that a bottom portion 110_4 includes an inclined portion 111_4 inclined downward toward the center and a groove-shaped collection portion 113_4 disposed in the center and further recessed than the inclined portion 111_4, and a collection groove 115_4 defined by an inner surface of the inclined portion 111_4 and an upper surface of the collection portion 113_4 is located at the center of the bottom portion 110_4. The same or like elements shown in FIG. 16 have been labeled with the same reference characters as used above to describe the embodiments of the glass substrate chemical strengthening furnace apparatus shown in FIG. 6, and any repetitive detailed description thereof will hereinafter be omitted or simplified.

In an embodiment, fine glass particles 12_4 may be deposited on the upper surface of the bottom portion 110_4 due to a difference in specific gravity from a molten salt. The fine glass particles 12_4 may move to the collection groove 115_4 along an inclined surface. The fine glass particles 12_4 deposited in the collection groove 115_4 may be discharged to the outside by a discharge unit 140_4 connected to the collection groove 115_4. When the fine glass particles 12_4 are discharged to the outside, the molten salt may be discharged together. The discharge of the fine glass particles 12_4 may be performed before a next ion exchange process is started after the ion exchange process is finished.

In such an embodiment, the glass substrate chemical strengthening furnace apparatus 100_4 may have a structure to minimize an effect due to the fine glass particles 12_4 that may cause scratches or stabbed defects on another ultra-thin glass 10_4 in the ion exchange process of the chemical strengthening step of the ultra-thin glass 10_4. Accordingly, in such an embodiment, the occurrence of scratches and stabbed defects caused by the fine glass particles 12_4 scattered in the glass substrate chemical strengthening furnace apparatus 100_4.

According to the glass substrate chemical strengthening furnace apparatus according to the embodiment, it is possible to minimize the occurrence of scratches and stabbed defects caused by fine glass particles scattered in the glass substrate chemical strengthening furnace apparatus may be substantially minimized or effectively prevented.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A method for chemically strengthening a glass substrate using a glass substrate chemical strengthening furnace apparatus, the glass substrate chemical strengthening furnace apparatus comprising:
a bottom portion and a side wall extending from an edge of the bottom portion, wherein the bottom portion and the side wall define a reaction space; and
a plurality of heaters which provides heat to the reaction space,
wherein the bottom portion includes an inclined portion located at a center thereof and a collection portion disposed between the inclined portion and the side wall,
wherein the collection portion is in a groove shape in which an upper surface thereof is further recessed than the inclined portion,
wherein the plurality of heaters includes a bottom heater disposed in the bottom portion or adjacent to the bottom portion, and
wherein the inclined portion includes:
a first floor extending in a first direction;
a second floor extending in a second direction different from the first direction;
a first inclined portion disposed on both sides of the first floor in the second direction; and
a second inclined portion disposed on both sides of the second floor in the first direction,
wherein the first inclined portion is inclined downward to both sides of the second floor in the first direction,
wherein the second inclined portion is inclined downward to both sides of the first floor in the second direction.

2. The method for chemically strengthening using the glass substrate chemical strengthening furnace apparatus of claim 1,
wherein the plurality of heaters further includes a side wall heater disposed in the side wall or adjacent to the side wall.

3. The method for chemically strengthening using the glass substrate chemical strengthening furnace apparatus of claim 2,
wherein the side wall heater is spaced apart from the collection portion with a predetermined distance.

4. The method for chemically strengthening using the glass substrate chemical strengthening furnace apparatus of claim 1,
wherein the bottom heater is disposed in the inclined portion or adjacent to upper and lower portions of the inclined portion.

5. The method for chemically strengthening using the glass substrate chemical strengthening furnace apparatus of claim 4,
wherein the bottom heater is spaced apart from the collection portion with a predetermined distance.

6. The method for chemically strengthening using the glass substrate chemical strengthening furnace apparatus of claim 1, further comprising:
a discharge unit including a drain, through which a material in the reaction space is discharged to an outside, and a valve which controls a flow in the drain.

7. The method for chemically strengthening using the glass substrate chemical strengthening furnace apparatus of claim 6,
wherein the discharge unit is disposed through the side wall.

8. The method for chemically strengthening using the glass substrate chemical strengthening furnace apparatus of claim 7,
wherein an inlet of the drain is disposed adjacent to the collection portion.

9. The method for chemically strengthening using the glass substrate chemical strengthening furnace apparatus of claim 6,
wherein the discharge unit is disposed through the collection portion.

10. The method for chemically strengthening using the glass substrate chemical strengthening furnace apparatus of claim 1,
wherein a valley defined by the upper surface of the first inclined portion and the upper surface of the second inclined portion is inclined downward toward the collection portion side.

11. The method for chemically strengthening using the glass substrate chemical strengthening furnace apparatus of claim 1,
    wherein an inclination angle of the inclined portion is about 45° or less.

12. The glass substrate chemical strengthening furnace apparatus of claim 1,
    wherein an upper surface of the collection portion, a side surface of the inclined portion extending from the upper surface of the collection portion, and an inner surface of the side wall extending from the upper surface of the collection portion define a groove-shaped collection groove.

\* \* \* \* \*